(12) United States Patent
Shin

(10) Patent No.: US 11,634,113 B2
(45) Date of Patent: Apr. 25, 2023

(54) SYSTEM AND METHOD FOR CONTROLLING DRIVING OF ELECTRONIC 4-WHEEL DRIVE HYBRID VEHICLE

(71) Applicants: Hyundai Motor Company, Seoul (KR); Kia Motors Corporation, Seoul (KR)

(72) Inventor: Dong Jun Shin, Hwaseong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 120 days.

(21) Appl. No.: 17/193,523

(22) Filed: Mar. 5, 2021

(65) Prior Publication Data

US 2022/0055602 A1 Feb. 24, 2022

(30) Foreign Application Priority Data

Aug. 24, 2020 (KR) .................. 10-2020-0105841

(51) Int. Cl.
*B60W 20/10* (2016.01)
*B60W 10/119* (2012.01)
(Continued)

(52) U.S. Cl.
CPC ............. *B60W 10/119* (2013.01); *B60K 6/52* (2013.01); *B60K 6/54* (2013.01); *B60K 23/0808* (2013.01); *B60W 10/06* (2013.01); *B60W 10/08* (2013.01); *B60W 20/10* (2013.01); *B60W 50/00* (2013.01); *B60W 2050/0041* (2013.01); *B60W 2510/1005* (2013.01); *B60W 2510/1015* (2013.01); *B60W 2520/10* (2013.01); *B60W 2710/0666* (2013.01); *B60W 2710/0677* (2013.01); *B60W 2710/083* (2013.01); *B60W 2710/086* (2013.01);
(Continued)

(58) Field of Classification Search
CPC .... B60W 10/119; B60W 10/06; B60W 10/08; B60W 20/10; B60W 2050/0041; B60W 2510/1005; B60W 2510/1015; B60W 2520/10; B60W 2710/0666; B60W 2710/0677; B60W 2710/083; B60W 2710/086; B60W 2720/403; B60K 6/52; B60K 6/54; B60K 23/0808; B60Y 2200/92; B60Y 2400/82
See application file for complete search history.

(56) References Cited

U.S. PATENT DOCUMENTS 10,427,669 B2 * 10/2019 Chang .................. B60W 30/18
2016/0297440 A1 * 10/2016 Lee ........................ B60W 10/08
(Continued)

*Primary Examiner* — Tisha D Lewis
(74) *Attorney, Agent, or Firm* — Morgan, Lewis & Bockius LLP

(57) ABSTRACT

A system and method for controlling driving of an electronic 4-wheel drive hybrid vehicle appropriately executes torque distribution and compensation to front wheels and rear wheels in each gear position to satisfy driver's requested torque depending on selected driving mode of the electronic 4-wheel drive hybrid vehicle in which an engine and a front wheel motor are connected to the front wheels and a rear wheel motor is connected to the rear wheels, thereby being capable of increasing acceleration performance when a sports mode is selected as the driving mode and realizing acceleration linearity when a comfort mode is selected as the driving mode.

15 Claims, 5 Drawing Sheets

(51) Int. Cl.
*B60W 10/06* (2006.01)
*B60W 10/08* (2006.01)
*B60K 6/54* (2007.10)
*B60K 23/08* (2006.01)
*B60W 50/00* (2006.01)
*B60K 6/52* (2007.10)

(52) U.S. Cl.
CPC .... *B60W 2720/403* (2013.01); *B60Y 2200/92* (2013.01); *B60Y 2400/82* (2013.01)

(56) References Cited

U.S. PATENT DOCUMENTS

2017/0057487 A1* 3/2017 Kim ........................ B60K 6/442
2019/0077258 A1* 3/2019 Cho ...................... B60W 10/06

* cited by examiner

SYSTEM AND METHOD FOR CONTROLLING DRIVING OF ELECTRONIC 4-WHEEL DRIVE HYBRID VEHICLE

CROSS-REFERENCE TO RELATED APPLICATION

The present application claims priority to Korean Patent Application No. 10-2020-0105841 filed on Aug. 24, 2020, the entire contents of which is incorporated herein for all purposes by this reference.

BACKGROUND OF THE INVENTION

Field of the Invention

The present invention relates to a system and method for controlling driving of an electronic 4-wheel drive hybrid vehicle. More particularly, it relates to a method for controlling driving of an electronic 4-wheel drive hybrid vehicle in which acceleration performance may be improved and acceleration linearity may be realized with selectable driving modes of the 4-wheel drive hybrid electric vehicle in which an engine and a front wheel motor are connected to front wheels and a rear wheel motor is connected to rear wheels.

Description of Related Art

As is well known, an electric motor configured as a driving source is mounted in a hybrid vehicle, an electric vehicle, a hydrogen fuel cell vehicle, etc., and these vehicles are referred to as electrified vehicles.

Among these electrified vehicles, in a hybrid vehicle, a 4-wheel drive powertrain, in which an engine and a front wheel motor are connected to front wheels and a rear wheel motor having a smaller size than the front wheel motor is connected to rear wheels as driving sources, may be mounted.

In case of the 4-wheel drive powertrain apparatus of the hybrid vehicle, a method for controlling driving of the 4-wheel drive powertrain apparatus which is optimized for driving of the vehicle is not established yet, and the rear wheel motor is limitedly driven only to assist in driving the 4-wheel drive powertrain, and therefore, application of a method for more effectively controlling driving of the 4-wheel drive powertrain apparatus depending on the driving mode of the vehicle is required.

Furthermore, when driving force of the engine and/or the front wheel motor configured for starting the hybrid vehicle provided with the 4-wheel drive powertrain apparatus mounted therein is lost or cut off due to the shifting process of an automatic transmission, it is difficult to secure acceleration linearity while starting the hybrid vehicle.

The information disclosed in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a system and method for controlling driving of a 4-wheel drive hybrid vehicle in which torque distribution and compensation to front wheels and rear wheels in each gear position are appropriately executed to satisfy driver's requested torque depending on a selected driving mode of the electronic 4-wheel drive hybrid vehicle in which an engine and a front wheel motor are connected to the front wheels and a rear wheel motor is connected to the rear wheels, thereby being capable of increasing acceleration performance when a sports mode is selected as the driving mode and realizing acceleration linearity when a comfort mode is selected as the driving mode.

Various aspects of the present invention are directed to providing a system for controlling driving of an electronic 4-wheel drive hybrid vehicle, the system including a first powertrain apparatus for front wheels including an engine, a front wheel motor, an engine clutch mounted between the engine and the front wheel motor to transmit or cut off power of the engine, and a transmission mounted between the front wheel motor and the front wheels and configured to shift the power of the engine and power of the front wheel motor and to output the shifted powers to front wheels, a second powertrain apparatus for rear wheels including a rear wheel motor, and a reducer connected to the rear wheel motor and configured to reduce power of the rear wheel motor and to output the reduced power to the rear wheels, and a controller configured to control the driving of the electronic 4-wheel drive hybrid vehicle to further output rear wheel torque determined based on rear wheel motor torque for satisfying driver's requested torque in addition to front wheel torque determined based on maximum engine torque and maximum front wheel motor torque, when a first mode in which acceleration performance is preferentially considered is selected as a driving mode, or configured to control the driving of the electronic 4-wheel drive hybrid vehicle to further output rear wheel compensation torque determined based on deviation between front wheel torque in a current gear position at a point in time just before shifting and front wheel torque in a previous gear position at a point in time just before shifting in addition to a front wheel torque due to driving of the engine and the front wheel motor in each of a second gear position and higher gear positions, when a second mode in which acceleration linearity is preferentially considered is selected as the driving mode.

Various aspects of the present invention are directed to providing a method for controlling driving of an electronic 4-wheel drive hybrid vehicle including a powertrain apparatus for front wheel including an engine, a front wheel motor, an engine clutch mounted between the engine and the front wheel motor to transmit or cut off power of the engine, and a transmission mounted between the front wheel motor and the front wheels and configured to shift the power of the engine and power of the front wheel motor and to output the shifted power to the front wheels, and a second powertrain apparatus for rear wheels including a rear wheel motor, and a reducer connected to the rear wheel motor and configured to reduce power of the rear wheel motor and to output the reduced power to the rear wheels, the method including selecting a driving mode, controlling, by a controller, driving of the electronic 4-wheel drive hybrid vehicle in a first mode in which acceleration performance is preferentially considered, to further output rear wheel torque determined based on rear wheel motor torque for satisfying driver's requested torque in addition to front wheel torque determined based on maximum engine torque and maximum front wheel motor torque, when the first mode is selected as a driving mode, and controlling, by the controller, driving of the electronic 4-wheel drive hybrid vehicle in a second mode in which acceleration linearity is preferentially considered, to further output rear wheel compensation torque determined based on deviation between front wheel torque in a current gear position at a point in time just before shifting and front wheel torque in a previous gear position at a point in time just before shifting in addition to a front wheel torque due to driving of the engine and the front wheel motor in each of a second gear position and higher gear positions, when the second mode is selected as the driving mode.

Other aspects and exemplary embodiments of the present invention are discussed infra.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
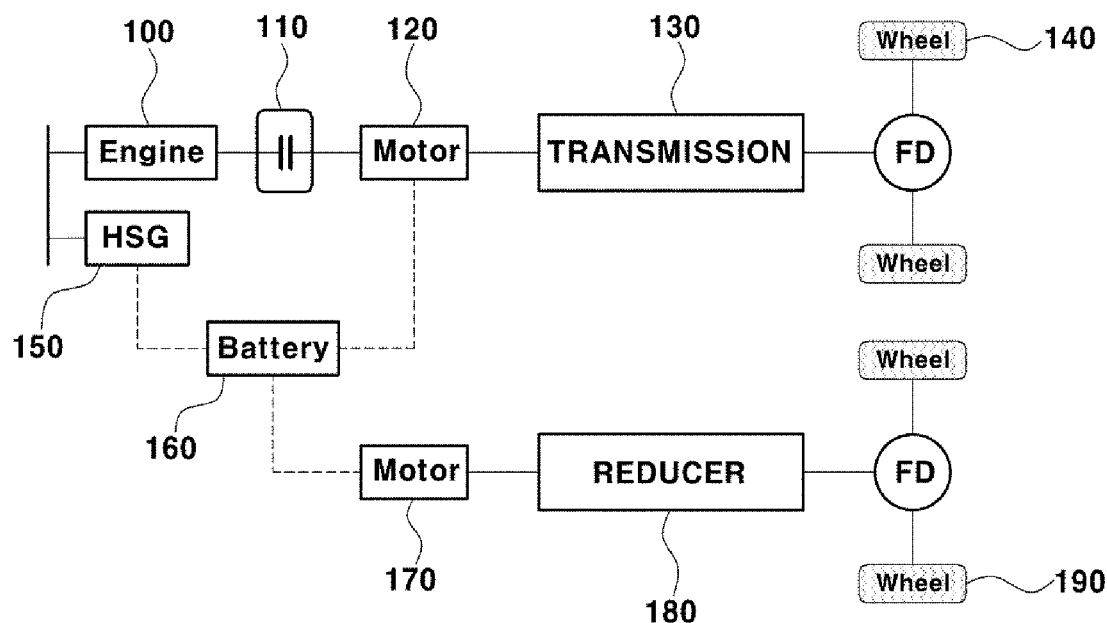
FIG. 1 is a power transmission distribution diagram of an electronic 4-wheel drive hybrid vehicle.

It should be understood that the appended drawings are not necessarily to scale, presenting a somewhat simplified representation of various exemplary features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter reference will be made in detail to various embodiments of the present invention, examples of which are illustrated in the accompanying drawings and described below. While the present invention will be described in conjunction with exemplary embodiments of the present invention, it will be understood that the present description is not intended to limit the present invention to the exemplary embodiments. On the other hand, the present invention is directed to cover not only the exemplary embodiments of the present invention, but also various alternatives, modifications, equivalents and other embodiments, which may be within the spirit and scope of the present invention as defined by the appended claims.

Figure 2:
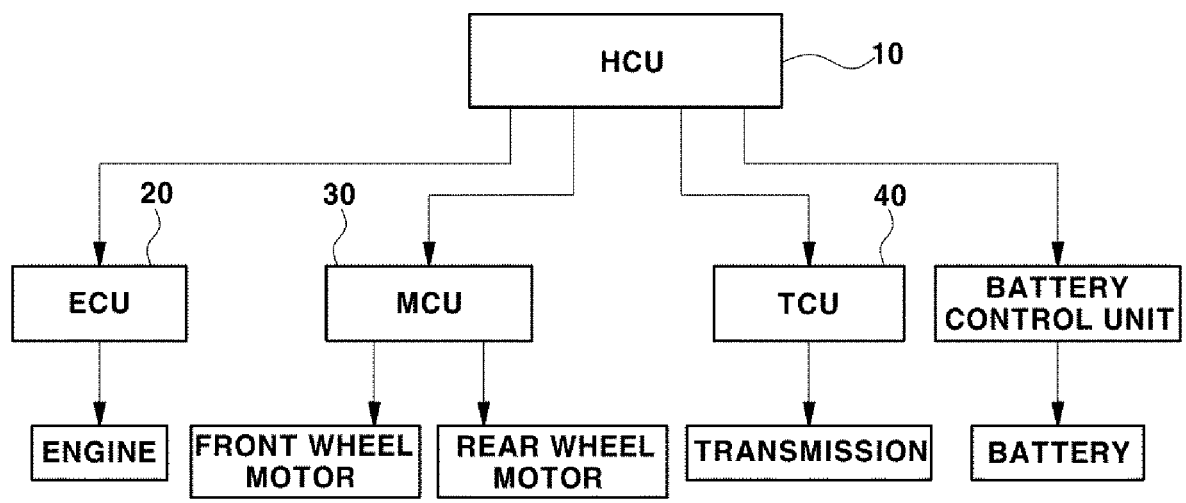
FIG. 2 is block diagram illustrating a method for controlling driving of an electronic 4-wheel drive hybrid vehicle according to various exemplary embodiments of the present invention.

FIG. 1 is a power transmission distribution diagram of an electronic 4-wheel drive (E-4WD) hybrid vehicle in which a powertrain apparatus for front wheels having an engine and a front wheel motor and a powertrain apparatus for rear wheels having a rear wheel motor are combined, and FIG. 2 is block diagram illustrating a method for controlling driving of an electronic 4-wheel drive hybrid vehicle according to various exemplary embodiments of the present invention.

As shown in FIG. 1, the powertrain apparatus for front wheels includes an engine 100, a front wheel motor 120, an engine clutch 110 which is mounted between the engine 100 and the front wheel motor 120 and transmits or cuts off power of the engine 100, a transmission 130 which shifts the power of the engine 100 and power of the front wheel motor 120 and outputs the shifted powers to front wheels 140, a hybrid starter generator (HSG) 150 which is connected to a crank pulley of the engine 100 and starts and generates the engine 100, and a battery 160 which is connected to the front wheel motor 120 and the HSG 150 to be chargeable and dischargeable.

The powertrain apparatus for rear wheels includes a rear wheel motor 170 which is connected to the battery 160 such that the battery 160 is chargeable and dischargeable, and a reducer 180 which reduces the power of the rear wheel motor 170 and outputs the reduced power to rear wheels 190.

In various exemplary embodiments of the present invention, in the electronic 4-wheel drive (E-4WD) hybrid vehicle in which the powertrain apparatus for front wheels and the powertrain apparatus for rear wheels are combined, torque is appropriately distributed to the front wheels and the rear wheels in each gear position depending on a driving mode selected by a driver, and thus, when a first mode in which acceleration performance is preferentially considered is selected as the driving mode, acceleration performance may be increased, and when a second mode in which acceleration linearity is preferentially considered is selected as the driving mode, acceleration linearity may be realized.

Here, the first mode in which acceleration performance is preferentially considered may be referred to as a sports mode, and the second mode in which acceleration linearity is preferentially considered may be referred to as a comfort mode.

As a controller configured to control the driving of the electronic 4-wheel drive (E-4WD) hybrid vehicle, as shown in FIG. 2, a hybrid control unit (HCU) 10 configured as an upper-level control unit and configured to give instructions to distribute front wheel torque and rear wheel torque in each gear position depending on the driving mode selected by the driver, an engine control unit (ECU) 20 configured to receive instructions from the HCU 10 and thus to control the overall operation and the operating point of the engine 100, a motor control unit (MCU) 30 configured to receive torque instructions from the HCU 10 to control the overall operation of the front wheel motor 120 and the rear wheel motor 170, and a transmission control unit (TCU) 40 configured to control respective gear positions of the transmission 130.

Here, a method for controlling driving of the electronic 4-wheel drive (E-4WD) hybrid vehicle according to various exemplary embodiments of the present invention in each driving mode will be referred to as follows.

First Mode

Figure 3:
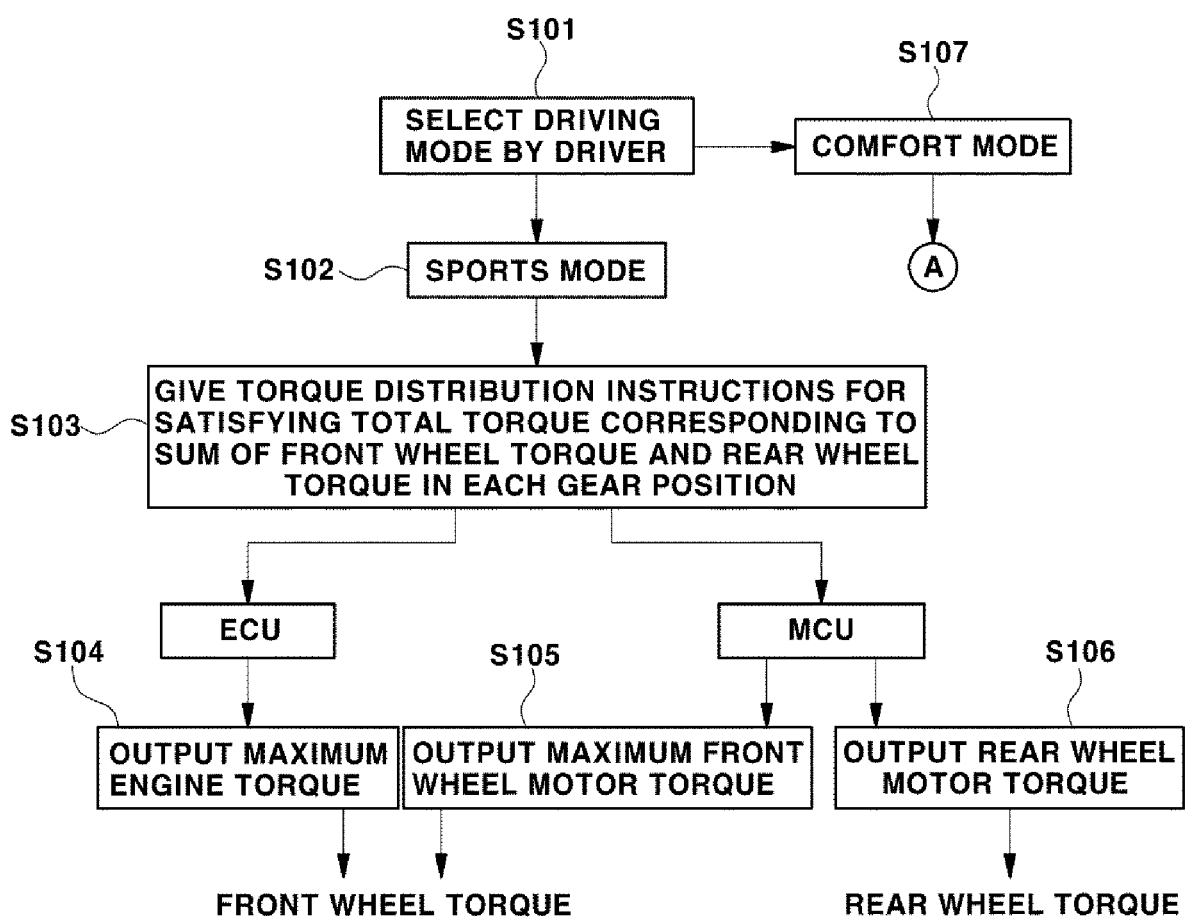
FIG. 3 is a flowchart illustrating a process for controlling driving of the electronic 4-wheel drive hybrid vehicle according to various exemplary embodiments of the present invention when a sports mode, i.e., a first mode, is selected.
Figure 4:
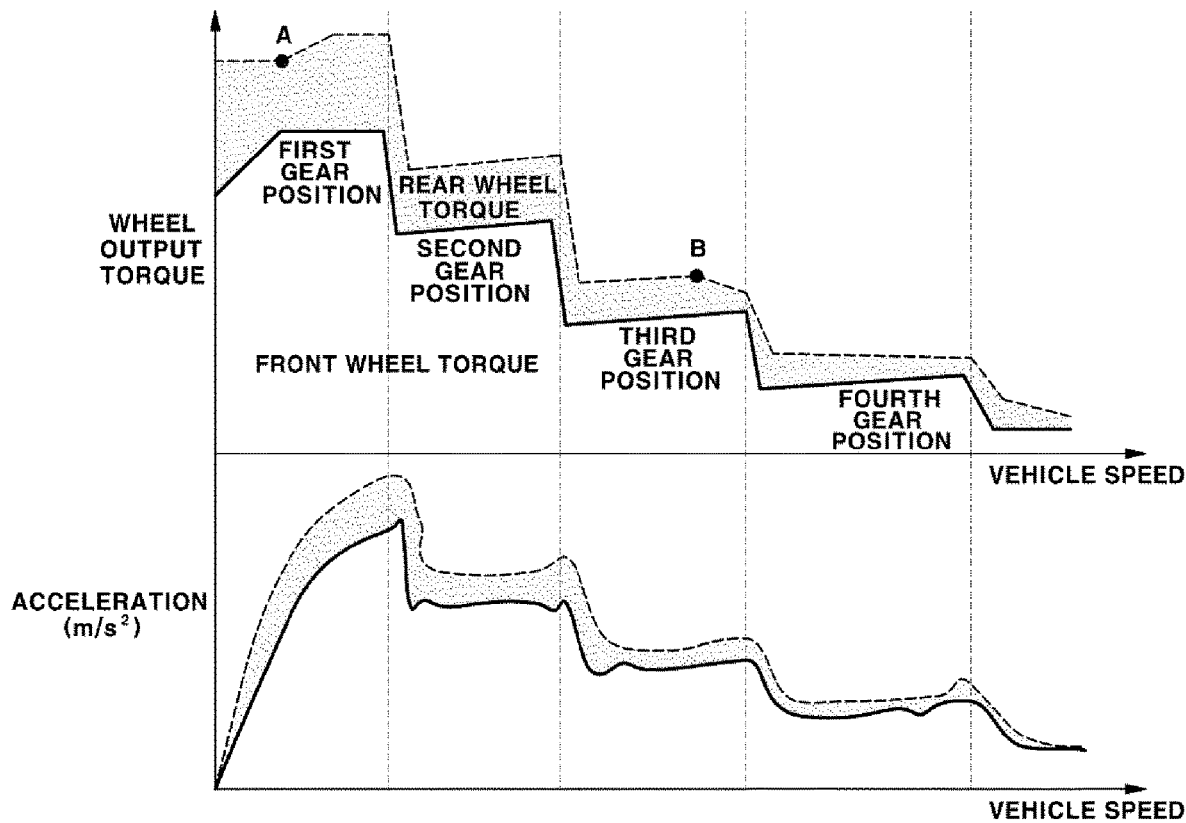
FIG. 4 illustrates a graph of torque and a graph of acceleration, showing increase in acceleration performance in the sports mode, i.e., the first mode, in the method according to various exemplary embodiments of the present invention.

FIG. 3 is a flowchart illustrating a process for controlling driving of the electronic 4-wheel drive hybrid vehicle according to various exemplary embodiments of the present invention when the first mode is selected, and FIG. 4 illustrates a graph of torque and a graph of acceleration, showing increase in acceleration performance in the first mode in the method according to various exemplary embodiments of the present invention.

First, after the vehicle is started, a driver selects a driving mode (S101).

For example, the driver selects the sports mode, i.e., the first mode in which acceleration performance is preferentially considered, or the comfort mode, i.e., the second mode in which acceleration linearity is preferentially considered, by operating a selection switch mounted around a driver's seat.

When the first mode is selected as the driving mode, rear wheel torque due to driving of the rear wheel motor 170 is further output in addition to front wheel torque due to driving of the engine 100 and the front wheel motor 120 in each gear position by the controller including the HCU 10, the ECU 20 and the MCU 30.

Here, when the first mode is selected as the driving mode (S102), the HCU 10 gives torque distribution instructions to satisfy the total wheel torque, which is the sum of the front wheel torque and the rear wheel torque, in each gear position to the ECU 20 and the MCU 30 (S103).

When the first mode is selected as the driving mode, the total wheel torque, which is the sum of the front wheel torque and the rear wheel torque, may be determined by the size of driver's requested torque in a current gear position.

When the first mode is selected as the driving mode, the total wheel torque for satisfying the driver's requested torque in the current gear position may be determined using Equation 1 below.

Total Wheel Torque={(Maximum Engine Torque+Maximum Front Wheel Motor Torque)×Gear Ratio in Current Gear Position×Final Reduction Gear Ratio}+(Rear Wheel Motor Torque×Gear Ratio of Reducer)  [Equation 1]

Here, the transmission 130, which shifts the power of the engine 100 and the front wheel motor 120 and outputs the shifted power to the front wheels 140, includes gears for respective gear positions and a final reduction gear for final reduction, and thus, when the total wheel torque is determined, the gear ratio of a corresponding gear in the current gear position and the gear ratio of the final reduction gear, i.e., a final reduction gear ratio (FGR), are used.

Furthermore, the reducer 180, which reduces the power of the rear wheel motor 170 and outputs the reduced power to rear wheels 190, includes a reduction gear, and thus, when the total wheel torque is determined, the gear ratio of the reduction gear is used.

Therefore, when the first mode is selected as the driving mode, as stated in Equation 1, rear wheel torque, which is determined by multiplying rear wheel motor torque for satisfying the driver's requested torque by the gear ratio of the reduction gear, may be further output in addition to front wheel torque, which is determined by multiplying the sum of the maximum engine torque and the maximum front wheel motor torque by the gear ratio in the current gear position and the final reduction gear ratio.

Therefore, when the first mode is selected as the driving mode, the HCU 10 gives the torque distribution instructions to satisfy the total wheel torque, which is expressed in Equation 1, to the ECU 20 and the MCU 30.

Thereafter, the engine 100 outputs maximum engine torque to the front wheels under the torque control of the ECU 20 (S104), the front wheel motor 120 output maximum front wheel motor torque to the front wheels under the torque control of the MCU 30 (S105), and therefore, front wheel torque applied to the front wheels becomes {(Maximum Engine Torque+Maximum Front Wheel Motor Torque)×Gear Ratio in Current Gear Position×Final Reduction Gear Ratio}.

At the same time, the rear wheel motor 170 outputs rear wheel motor torque to the rear wheels under the torque control of the MCU 30 (S106), and therefore, rear wheel torque applied to the rear wheels becomes [Rear Wheel Motor Torque×Gear Ratio of Reduction Gear].

Figure 5:
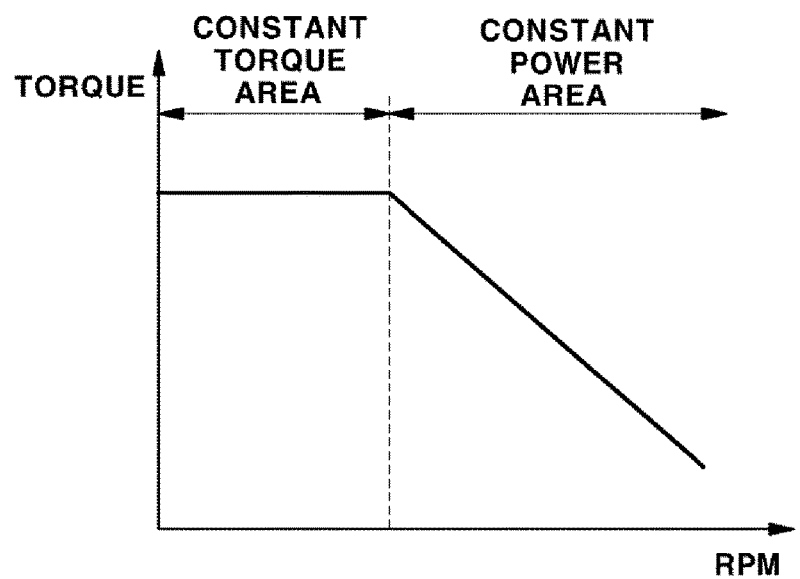
FIG. 5 illustrates a graph of torque of a rear wheel motor of the electronic 4-wheel drive hybrid vehicle.

The rear wheel motor torque output in Operation S106 may be output as torque belonging to a constant torque area to perform acceleration at lower than a designated vehicle speed (for example, maximum rear wheel motor torque), and be output as torque belonging to a constant power area at the designated vehicle speed or higher (for example, torque which is gradually constantly decreased from the maximum rear wheel motor torque as the vehicle speed is increased), as shown in FIG. 5.

Therefore, as shown in the graph of torque and the graph of acceleration of FIG. 4, the rear wheel torque due to driving of the rear wheel motor 170 is further output in each gear position in addition to a front wheel torque due to driving of the engine 100 and the front wheel motor 120, and thus, acceleration performance may be increased.

For reference, a point A in FIG. 4 represents a point in time at which an electric vehicle (EV) mode, in which a vehicle is driven using only the power of a front wheel motor, is switched to a hybrid electric motor (HEV) mode, in which a vehicle is driven using both the power of the front wheel motor and the motor of an engine, and a point B in FIG. 4 represents a point in time at which driving of the rear wheel motor 170 transitions from the constant torque area to the constant power area.

Accordingly, when the driver selects the sports mode, i.e., the first mode in which acceleration performance is preferentially considered, as the driving mode, the rear wheel torque due to driving of the rear wheel motor 170 is further output in each gear position in addition to a front wheel torque due to driving of the engine 100 and the front wheel motor 120, and thus, acceleration performance of the vehicle may be increased.

Second Mode

Figure 6:
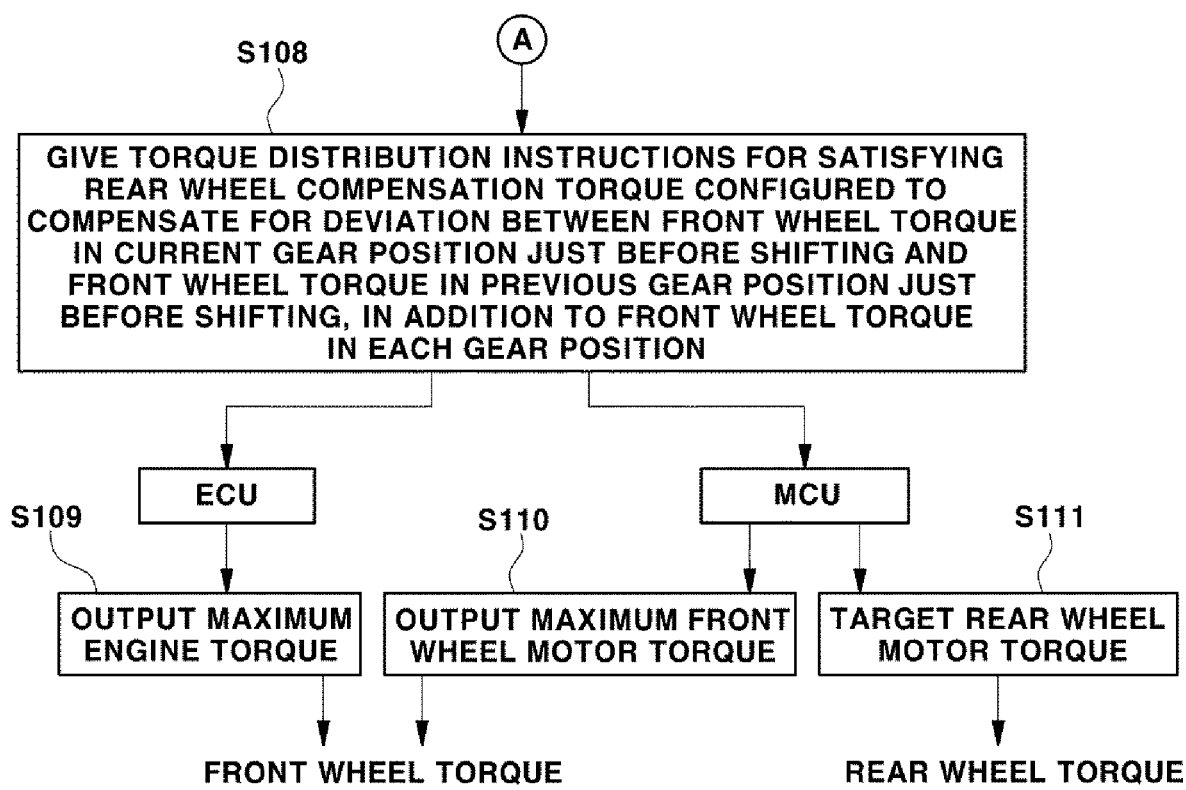
FIG. 6 is a flowchart illustrating a process for controlling driving of the electronic 4-wheel drive hybrid vehicle according to various exemplary embodiments of the present invention when a comfort mode, i.e., a second mode, is selected.
Figure 7:
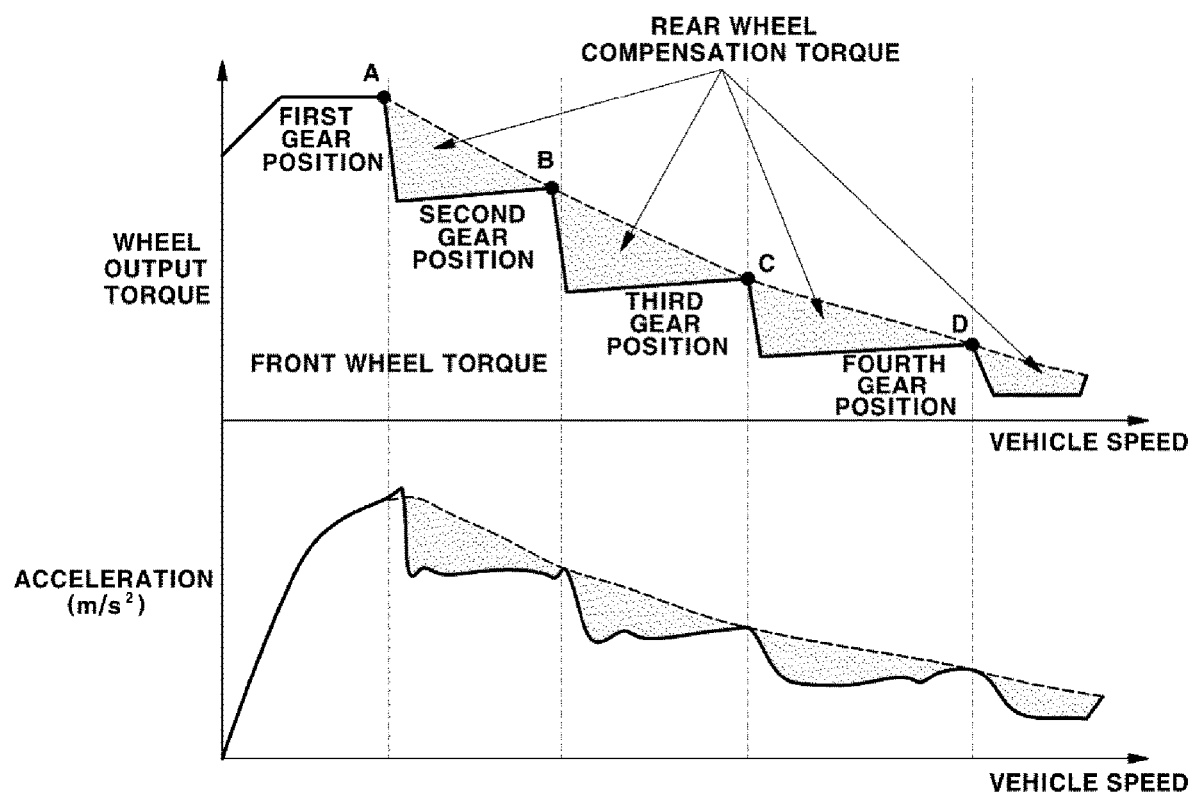
FIG. 7 illustrates a graph of torque and a graph of acceleration, showing implementation of acceleration linearity in the comfort mode, i.e., the second mode, in the method according to various exemplary embodiments of the present invention.

FIG. 6 is a flowchart illustrating a process for controlling driving of the electronic 4-wheel drive hybrid vehicle according to various exemplary embodiments of the present invention when the second mode is selected, and FIG. 7 illustrates a graph of torque and a graph of acceleration, showing implementation of acceleration linearity in the second mode in the method according to various exemplary embodiments of the present invention.

When the comfort mode, i.e., the second mode in which acceleration linearity is preferentially considered, is selected as the driving mode, rear wheel compensation torque due to driving of the rear wheel motor 170 is further output in addition to front wheel torque due to driving of the engine 100 and the front wheel motor 120 in each of a second gear position and higher gear positions by the controller including the HCU 10, the ECU 20 and the MCU 30.

Therefore, in Operation S101, when a driver selects the second mode as the driving mode (S107), the HCU 10 gives torque distribution instructions to satisfy the rear wheel compensation torque which compensates for deviation between front wheel torque in a current gear position just before shifting and front wheel torque in a previous gear position just before shifting in addition to the front wheel torque in each gear position, to the ECU 20 and the MCU 30 (S108).

The rear wheel compensation torque may be determined by the following calculation process.

First, front wheel torque in each gear position at a point in time just before shifting (for example, a point indicated by A, B, C or D in FIG. 7) is calculated.

The front wheel torque in each gear position at the point in time just before shifting may be determined using Equations below.

Front Wheel Torque in First Gear Position={(Maximum Engine Torque+Maximum Front Wheel Torque) at Point in Time just before Shifting to Second Gear Position×Gear Ratio in First Gear Position×Final Reduction Gear Ratio}   [Equation 2]

Front Wheel Torque in Second Gear Position={(Maximum Engine Torque+Maximum Front Wheel Torque) at Point in Time just before Shifting to Third Gear Position×Gear Ratio in Second Gear Position×Final Reduction Gear Ratio}   [Equation 3]

Front Wheel Torque in Third Gear Position={(Maximum Engine Torque+Maximum Front Wheel Torque) at Point in Time just before Shifting to Fourth Gear Position×Gear Ratio in Third Gear Position×Final Reduction Gear Ratio}   [Equation 4]

Front Wheel Torque in Fourth Gear Position={(Maximum Engine Torque+Maximum Front Wheel Torque) at Point in Time just before Shifting to the Highest Gear Position×Gear Ratio in Fourth Gear Position×Final Reduction Gear Ratio}   [Equation 5]

For example, it may be understood that the point in time just before shifting to the second gear position is the point A in FIG. 7, the point in time just before shifting to the third gear position is the point B in FIG. 7, the point in time just before shifting to the fourth gear position is the point C in FIG. 7, and the point in time just before shifting to the highest gear position is the point D in FIG. 7.

Thereafter, the rear wheel compensation torque due to driving of the rear wheel motor 170 is calculated.

The rear wheel compensation torque may be determined as a value acquired by modeling deviation delta-Torque between front wheel torque in the current gear position n+1 just before shifting and front wheel torque in the previous gear position n just before shifting depending on an RPM input to the transmission 130.

In more detail, the rear wheel compensation torque may be determined by calculating an intermediate deviation value between front wheel torque in the current gear position n+1 at a point in time just before shifting and front wheel torque in the previous gear position n at a point in time just before shifting through interpolation depending on the range from the minimum RPM to the maximum RPM input to the transmission 130.

For example, rear wheel compensation torque in the second gear position may be determined by calculating an intermediate deviation value between front wheel torque in the second gear position at a point in time just before shifting to the third gear position and front wheel torque in the first gear position just before shifting to the second gear position through interpolation depending on the range from the minimum RPM to the maximum RPM input to the transmission 130.

Therefore, the total wheel torque in the current gear position n+1 may be determined as the sum of the front wheel torque in the current gear position n+1 and the rear wheel compensation torque calculated through the above calculation process.

Therefore, when the HCU 10 gives the torque distribution instructions to the MCU 30, the HCU 10 give instructions about target rear wheel motor torque for the above-calculated rear wheel compensation torque in the current gear position together with the torque distribution instructions, and the target rear wheel motor torque may be expressed by Equation 6 below.

Target Rear Wheel Motor Torque=Rear Wheel Compensation Torque in Current Gear Position/Gear Ratio in Current Gear Position/Final Reduction Gear Ratio   [Equation 6]

Consequently, the rear wheel compensation torque in the current gear position may be acquired by multiplying the target rear wheel motor torque by the gear ratio in the current gear position and the final reduction gear ratio, and be applied to the rear wheels.

Thereafter, target engine torque in each gear position is output to the front wheels under the torque control of the ECU 20 (S109), target front wheel motor torque is output to the front wheels under the torque control of the MCU 30 (S110), and thus, front wheel torque applied to the front wheels in each gear position is {(Target Engine Torque+Target Front Wheel Motor Torque)×Gear Ratio in Current Gear Position×Final Reduction Gear Ratio}.

At the same time, the rear wheel motor 170 outputs target rear wheel motor torque to the rear wheels under the torque control of the MCU 30 (S111), and thus, rear wheel compensation torque applied to the rear wheels in each gear position is [Target Rear Wheel Motor Torque×Gear Ratio in Current Gear Position×Final Reduction Gear Ratio].

Therefore, when the comfort mode, i.e., the second mode in which acceleration linearity is preferentially considered, is selected as the driving mode, as shown in the graph of torque and the graph of acceleration of FIG. 7, the rear wheel compensation torque due to driving of the rear wheel motor 170 is further output in each gear position in addition to a front wheel torque due to driving of the engine 100 and the front wheel motor 120, and thus, smooth acceleration linearity may be provided like in a continuously variable transmission (CVT)

As is apparent from the above description, a system and method for controlling driving of an electronic 4-wheel drive hybrid vehicle according to various exemplary embodiments of the present invention provide the following effects.

First, in the electronic 4-wheel drive hybrid vehicle in which an engine and a front wheel motor are connected to front wheels and a rear wheel motor is connected to rear wheels, when a driver selects a comfort mode, i.e., a second mode in which acceleration linearity is preferentially considered, as a driving mode, torque distribution and compensation to the front wheels and the rear wheels in each gear position are appropriately executed, and thus, smooth acceleration linearity may be provided like in a continuously variable transmission (CVT)

That is to say, in each gear position at a point in time just before shifting, engine torque and front wheel motor torque are applied to the front wheels and simultaneously compensation torque due to the rear wheel motor is applied to the rear wheels, thereby being capable of implementing smooth acceleration linearity.

Second, in the electronic 4-wheel drive hybrid vehicle in which the engine and the front wheel motor are connected to the front wheels and the rear wheel motor is connected to the rear wheels, when the driver selects a sports mode, i.e., a first mode in which acceleration performance is preferentially considered, as the driving mode, rear wheel motor torque is applied to the rear wheels in each gear position in addition to engine torque and front wheel motor torque applied to the front wheels, and thus, starting and acceleration performance may be increased due to additional torque of the rear wheel motor.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a controller, and the controller may be configured by a plurality of controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system for controlling driving of an electronic 4-wheel drive hybrid vehicle, the system comprising:
    a first powertrain apparatus for front wheels, wherein the first powertrain apparatus includes an engine, a front wheel motor, an engine clutch mounted between the engine and the front wheel motor to transmit or cut off power of the engine, and a transmission mounted between the front wheel motor and the front wheels and configured to shift the power of the engine and power of the front wheel motor and to output the shifted powers to the front wheels;
    a second powertrain apparatus for rear wheels, wherein the second powertrain apparatus includes a rear wheel motor, and a reducer connected to the rear wheel motor and configured to reduce power of the rear wheel motor and to output the reduced power to the rear wheels; and
    a controller configured to control the driving of the electronic 4-wheel drive hybrid vehicle to further output rear wheel torque determined according to rear wheel motor torque for satisfying driver's requested torque in addition to front wheel torque determined according to maximum engine torque and maximum front wheel motor torque, upon determining that a first mode in which acceleration performance is preferentially considered is selected as a driving mode, and configured to control the driving of the electronic 4-wheel drive hybrid vehicle to further output rear wheel compensation torque determined according to deviation between front wheel torque in a current gear position at a point in time before shifting and front wheel torque in a previous gear position at a point in time before shifting in addition to a front wheel torque due to driving of the engine and the front wheel motor in each of a second gear position and higher gear positions, upon determining that a second mode in which acceleration linearity is preferentially considered is selected as the driving mode.

2. The system of claim 1, wherein the controller is configured to give torque distribution instructions for satisfying total wheel torque corresponding to a sum of the front wheel torque and the rear wheel torque in each gear position.

3. The system of claim 2, wherein, according to the torque distribution instructions, with output of the front wheel torque, determined by multiplying a sum of the maximum engine torque and the maximum front wheel motor torque by a gear ratio in the current gear position and a final reduction gear ratio, to the front wheels, the rear wheel torque, determined by multiplying the rear wheel motor torque for satisfying the driver's requested torque by a gear ratio of a reduction gear, is further output to the rear wheels.

4. The system of claim 3, wherein the rear wheel motor torque is output as corresponding to a constant torque area to perform acceleration at lower than a predetermined vehicle speed, and is output as corresponding to a constant power area at the predetermined vehicle speed or higher than the predetermined vehicle speed.

5. The system of claim 1, wherein the controller is configured to give torque distribution instructions for satisfying the rear wheel compensation torque configured to compensate for the deviation between the front wheel torque in the current gear position at the point in time before shifting and the front wheel torque in the previous gear position at the point in time before shifting in addition to the front wheel torque in each gear position to further output the rear wheel compensation torque in addition to the front wheel torque in each gear position, upon determining that the second mode is selected as the driving mode.

6. The system of claim 5, wherein, according to the torque distribution instructions, the rear wheel compensation torque, determined by modeling the deviation between the front wheel torque in the current gear position at the point in time before shifting and the front wheel torque in the previous gear position at the point in time before shifting depending on revolutions per minute (RPM) input to the transmission in addition to the front wheel torque due to the driving of the engine and the front wheel motor in each of the second gear position and the higher gear positions.

7. The system of claim 6, wherein the rear wheel compensation torque is determined by calculating an intermediate deviation value between the front wheel torque in the current gear position at the point in time before shifting and the front wheel torque in the previous gear position at the point in time before shifting through interpolation depending on a range from a minimum RPM to a maximum RPM input to the transmission.

8. A method for controlling driving of an electronic 4-wheel drive hybrid vehicle including a first powertrain apparatus for front wheels, wherein the first powertrain apparatus includes an engine, a front wheel motor, an engine clutch mounted between the engine and the front wheel motor to transmit or cut off power of the engine, and a transmission mounted between the front wheel motor and the front wheels and configured to shift the power of the engine and power of the front wheel motor and to output the shifted power to the front wheels, and a second powertrain apparatus for rear wheels, wherein the second powertrain apparatus includes a rear wheel motor, and a reducer connected to the rear wheel motor and configured to reduce power of the rear wheel motor and to output the reduced power to the rear wheels, the method comprising:
    selecting a driving mode;
    controlling, by a controller, the driving of the electronic 4-wheel drive hybrid vehicle in a first mode in which acceleration performance is preferentially considered, to further output rear wheel torque determined according to rear wheel motor torque for satisfying driver's requested torque in addition to front wheel torque determined according to maximum engine torque and maximum front wheel motor torque, upon determining that the first mode is selected as a driving mode; and
    controlling, by the controller, driving of the electronic 4-wheel drive hybrid vehicle in a second mode in which acceleration linearity is preferentially considered, to further output rear wheel compensation torque determined according to deviation between front wheel torque in a current gear position at a point in time before shifting and front wheel torque in a previous gear position at a point in time before shifting in addition to a front wheel torque due to driving of the engine and the front wheel motor in each of a second gear position and higher gear positions, upon determining that the second mode is selected as the driving mode.

9. The method of claim 8, wherein the controlling, by the controller, of the driving of the electronic 4-wheel drive hybrid vehicle in the first mode comprises:
    giving torque distribution instructions for satisfying total wheel torque corresponding to a sum of the front wheel torque and the rear wheel torque in each gear position to further output the rear wheel torque in addition to the front wheel torque in each gear position.

10. The method of claim 9, wherein, in the giving the torque distribution instructions, with output of the front wheel torque, determined by multiplying a sum of the maximum engine torque and the maximum front wheel motor torque by a gear ratio in the current gear position and a final reduction gear ratio, to the front wheels, the rear wheel torque, determined by multiplying the rear wheel motor torque for satisfying the driver's requested torque by a gear ratio of a reduction gear, is further output to the rear wheels.

11. The method of claim 10, wherein the rear wheel motor torque is output as corresponding to a constant torque area to perform acceleration at lower than a predetermined vehicle speed, and is output as corresponding to a constant power area at the predetermined vehicle speed or higher than the predetermined vehicle speed.

12. The method of claim 8, wherein the controlling, by the controller, of the driving of the electronic 4-wheel drive hybrid vehicle in the second mode comprises:
    giving torque distribution instructions for satisfying the rear wheel compensation torque configured to compensate for the deviation between the front wheel torque in the current gear position at the point in time before shifting and the front wheel torque in the previous gear position at the point in time before shifting in addition to the front wheel torque in each gear position to further output the rear wheel compensation torque in addition to the front wheel torque in each gear position, upon determining that the second mode is selected as the driving mode.

13. The method of claim 12, wherein, according to the torque distribution instructions, the rear wheel compensation torque, determined by modeling the deviation between the front wheel torque in the current gear position at the point in time before shifting and the front wheel torque in the previous gear position at the point in time before shifting depending on revolutions per minute (RPM) input to the transmission in addition to the front wheel torque due to the driving of the engine and the front wheel motor in each of the second gear position and the higher gear positions.

14. The method of claim 13, wherein the rear wheel compensation torque is determined by calculating an intermediate deviation value between the front wheel torque in the current gear position at the point in time before shifting and the front wheel torque in the previous gear position at the point in time before shifting through interpolation depending on a range from a minimum RPM to a maximum RPM input to the transmission.

15. The method of claim 8, wherein the controller includes:
  a processor; and
  a non-transitory storage medium on which a program for performing the method of claim 8 is recorded and executed by the processor.

* * * * *